(12) United States Patent
Howard

(10) Patent No.: US 9,464,821 B2
(45) Date of Patent: Oct. 11, 2016

(54) SOLAR FURNACE

(75) Inventor: Brian Howard, Limassol (CY)

(73) Assignee: PDB Energy Systems Limited, Douglas (IM)

( * ) Notice: Subject to any disclaimer, the term of this patent is extended or adjusted under 35 U.S.C. 154(b) by 1328 days.

(21) Appl. No.: 13/140,896

(22) PCT Filed: Nov. 11, 2009

(86) PCT No.: PCT/GB2009/051509
§ 371 (c)(1),
(2), (4) Date: Jul. 21, 2011

(87) PCT Pub. No.: WO2010/073022
PCT Pub. Date: Jul. 1, 2010

(65) Prior Publication Data
US 2012/0017590 A1 Jan. 26, 2012

(30) Foreign Application Priority Data
Dec. 24, 2008 (GB) .................. 0823555.8

(51) Int. Cl.
*F24J 2/12* (2006.01)
*F24J 2/14* (2006.01)
(Continued)

(52) U.S. Cl.
CPC .............. *F24J 2/07* (2013.01); *F03G 6/065* (2013.01); *F22B 1/006* (2013.01); *F22G 5/12* (2013.01); *F24J 2/0433* (2013.01); *F24J 2/08* (2013.01);
(Continued)

(58) Field of Classification Search
CPC .............. F24J 2/12; F24J 2/14; F24J 2/246; F24J 2/5424; Y02E 10/45; Y02E 10/46; F03G 6/065

USPC .......... 60/641.8–641.15; 126/634–677, 692, 126/694, 704–713
See application file for complete search history.

(56) References Cited

U.S. PATENT DOCUMENTS 3,985,119 A * 10/1976 Oakes, Jr. .................. 126/600
3,999,389 A * 12/1976 Bryce ........................ 60/641.15
(Continued)

FOREIGN PATENT DOCUMENTS

CA 1148812 6/1983
JP 2008185300 8/2008

*Primary Examiner* — Nicholas J Weiss
*Assistant Examiner* — Wesley Harris
(74) *Attorney, Agent, or Firm* — Seed IP Law Group PLLC

(57) ABSTRACT

This invention relates to a solar furnace. In particular, this invention relates to a solar furnace which is capable of raising the temperature of transfer medium. In use, the heated transfer medium can be used to generate electricity or put to other work, such as, for example, air conditioning, pasteurisation or desalination. In fact, for any situation that requires a source to generate work or power. The present invention describes a solar furnace for raising the temperature of a heat transfer medium, comprising a lens array for admitting incident thermal and solar energy onto a reflector portion and a pressure vessel. The reflector portion being generally shaped so as to concentrate said solar energy onto said pressure vessel. The pressure vessel having an inlet through which said heat transfer medium is injected and a central core which defines a continuous heat transfer path for said heat transfer medium to contact the surface of said pressure vessel and exit said pressure vessel at an outlet. The solar furnace described herein is totally self-contained, requiring no additional power and can be used at the most remote locations requiring very little maintenance.

19 Claims, 9 Drawing Sheets

(51) Int. Cl.
*F03G 6/06* (2006.01)
*F24J 2/07* (2006.01)
*F24J 2/24* (2006.01)
*F22B 1/00* (2006.01)
*F22G 5/12* (2006.01)
*F24J 2/04* (2006.01)
*F24J 2/08* (2006.01)
*F24J 2/26* (2006.01)
*F24J 2/34* (2006.01)
*F24J 2/50* (2006.01)
*F24J 2/54* (2006.01)
*F24J 2/46* (2006.01)

(52) U.S. Cl.
CPC .. *F24J 2/12* (2013.01); *F24J 2/14* (2013.01); *F24J 2/246* (2013.01); *F24J 2/26* (2013.01); *F24J 2/345* (2013.01); *F24J 2/507* (2013.01); *F24J 2/541* (2013.01); *F24J 2/4638* (2013.01); *F24J 2002/4603* (2013.01); *F24J 2002/5462* (2013.01); *Y02B 10/20* (2013.01); *Y02E 10/41* (2013.01); *Y02E 10/44* (2013.01); *Y02E 10/45* (2013.01); *Y02E 10/46* (2013.01); *Y02E 10/47* (2013.01)

(56) References Cited

U.S. PATENT DOCUMENTS

| | | | | |
|---|---|---|---|---|
| 4,092,979 | A | * | 6/1978 | Kotlarz .................... 126/628 |
| 4,232,523 | A | * | 11/1980 | Derby et al. ............. 60/641.15 |
| 4,245,618 | A | * | 1/1981 | Wiener .................... 126/643 |
| 4,270,981 | A | * | 6/1981 | Stark ...................... 202/172 |
| 4,281,640 | A | * | 8/1981 | Wells ...................... 126/692 |
| 4,296,730 | A | * | 10/1981 | Zadiraka ................. 126/592 |
| 4,391,100 | A | * | 7/1983 | Smith ..................... 60/641.11 |
| 4,413,618 | A | | 11/1983 | Pitts et al. ................ 126/450 |
| 5,331,806 | A | | 7/1994 | Warkentin ............... 60/39.465 |
| 2007/0084207 | A1 | * | 4/2007 | Zuili et al. ............... 60/641.8 |
| 2008/0156315 | A1 | | 7/2008 | Yangpichit ............... 126/698 |

* cited by examiner

VIEW ON ARROW A

VIEW ON ARROW B

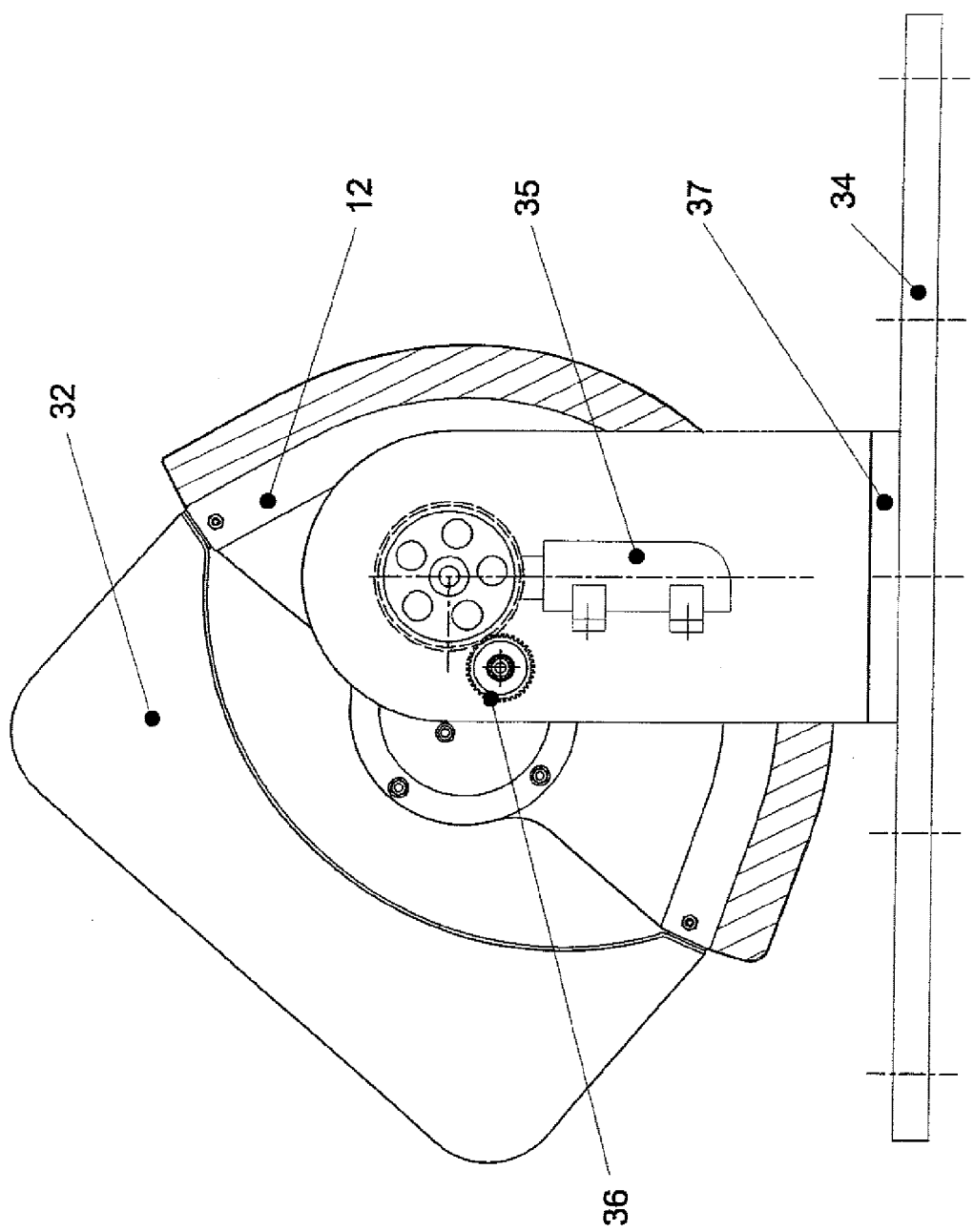

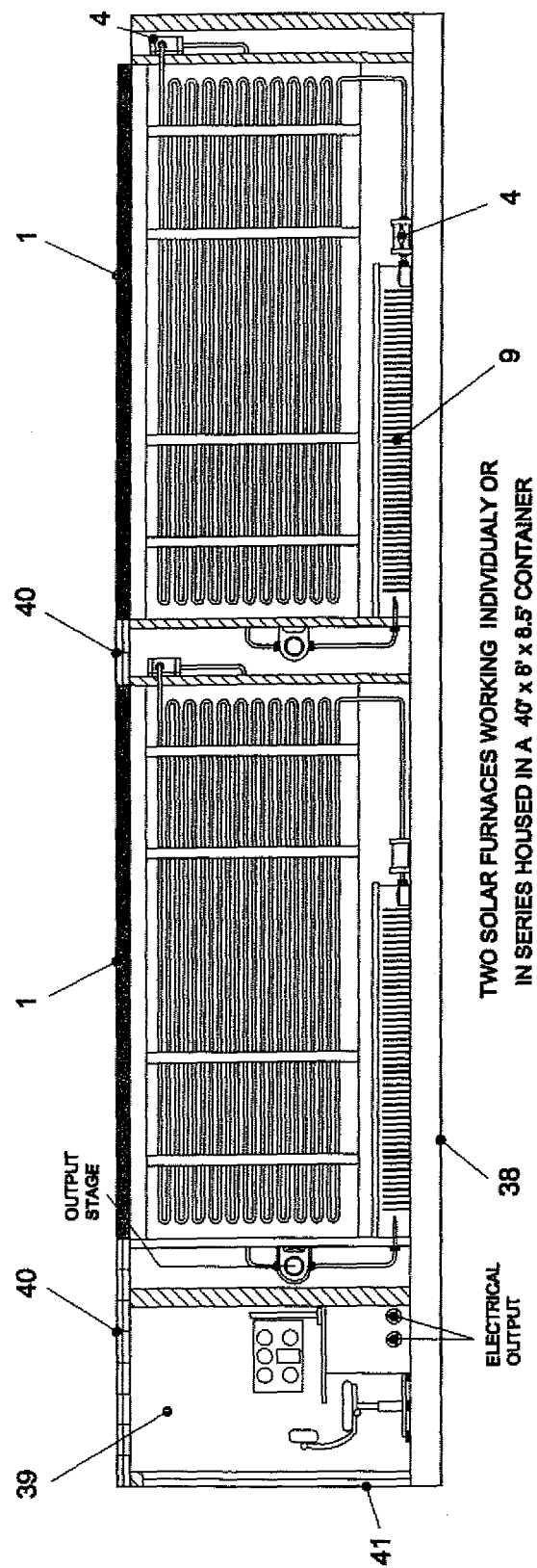

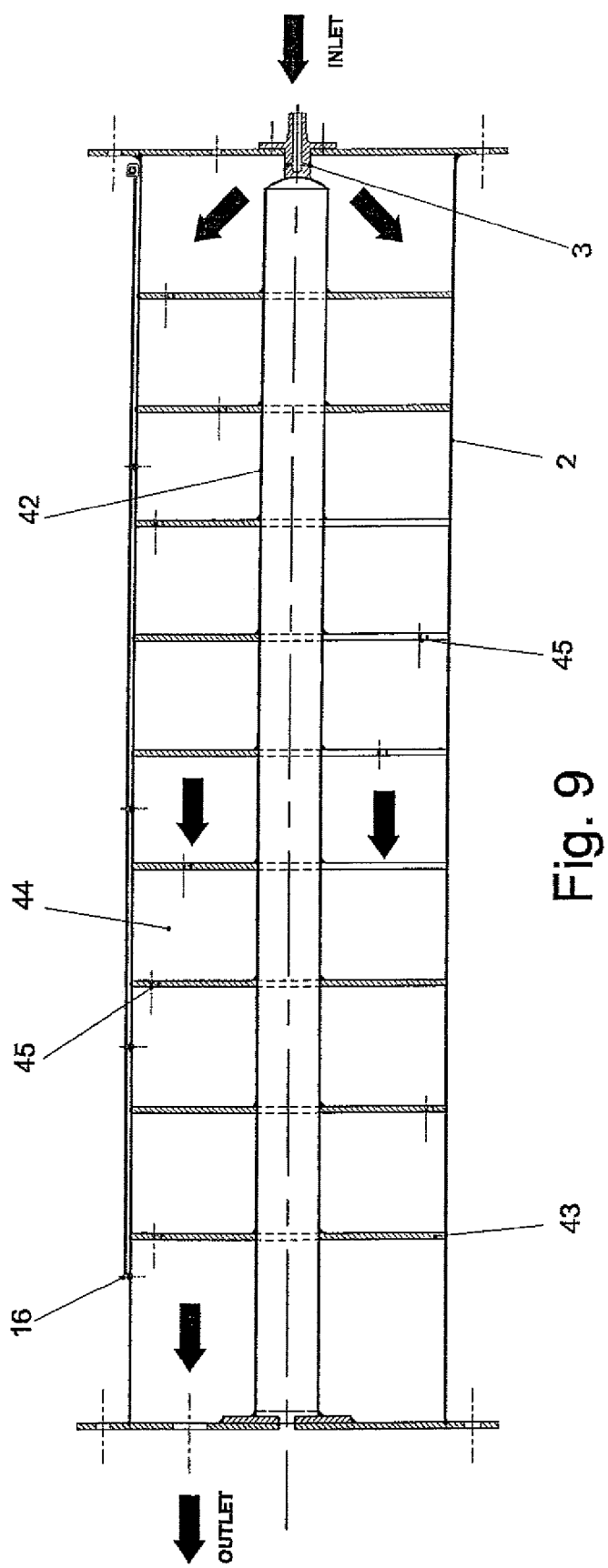

SOLAR FURNACE

This invention relates to a solar furnace. In particular, this invention relates to a solar furnace which is capable of raising the temperature of transfer medium. In use, the heated transfer medium can be used to generate electricity or put to other work, such as, for example, air conditioning, pasteurisation or desalination. In fact, any situation that requires a source to generate work or power.

In recent years, significant interest has been shown in renewable energy sources to reduce our dependency on finite fossil fuel reserves. In this regard, solar energy has been identified as one of the most promising renewable energy sources and significant advances have been made right across this field from photovoltaics to climate-responsive buildings and solar thermal systems which concentrate solar energy and transfer it to a fluid.

Solar thermal systems are generally implemented using a central receiver system which use heliostats that track the sun and focus it on a central receiver. The heat is used to boil a fluid, which is usually water, to make steam and drive a turbine to produce electricity. In use, these systems cover a large area and are not suitable for inhabited areas, since the temperatures involved are life-threatening. There is therefore a need for small, self-contained, solar thermal units which can provide a tangible and efficient source of energy.

It is the object of the present invention to provide a solar furnace that can be used for raising the temperature of a heat transfer medium using solar energy. In use, the heat transfer medium at the outlet of the solar furnace can be used generate electricity or put to other work, such as, for example, air conditioning, pasteurisation or desalination. In use, the heat transfer medium is returned through a condenser to start the cycle again. The present invention is provided as a sealed unit which requires little or no maintenance and requires no external power other than solar energy. The present invention can be used in isolation, or a number of such units can be coupled together to provide an environmentally-friendly, tangible energy source. Once positioned and commissioned, the present invention will remain as a static power source throughout its operational life. A range of mobile units working off the same principle have been produced.

According to the present invention there is provided a solar furnace for raising the temperature of a heat transfer medium, comprising; a lens array for admitting incident thermal and solar energy onto a reflector portion and a pressure vessel, said reflector portion being generally shaped so as to concentrate said solar energy onto said pressure vessel, said pressure vessel having an inlet through which said heat transfer medium is injected and a central core having a substantially helical cross-section which defines a continuous heat transfer path for said heat transfer medium to contact the surface of said pressure vessel and exit said pressure vessel at an outlet.

In a preferred embodiment, the lens array is formed as part of a substantially convex-shaped top which incorporates a series of light filters to stop solar energy of unwanted frequency being admitted. The lens array enhances the wanted light values and solar energy. In use, the substantially convex-shaped top also acts a protective cover that automatically closes down in low-light conditions or during hours of darkness and protects the solar furnace from adverse weather conditions. A wind barrier may be incorporated into the lens array for use in adverse weather conditions.

Preferably, said heat transfer medium is distilled water, although further additives may be included to enhance heat transfer and prevent corrosion and lower the flash point.

In use, said reflector portion ensures that pressure vessel is bombarded with greatly enhanced solar energy and light, and is shaped so as to direct as much of the incident solar energy onto the surface of the pressure vessel. Preferably, said reflector portion is formed from a reflective material having a substantially parabolic cross-section.

Further preferably, the solar furnace according to the present invention is provided as a unit comprising a main frame, bulkheads and removable sides, which can be secured using side panel fasteners. In order to increase overall efficiency of the heat transfer process, the area around the pressure vessel is preferably evacuated. In use, this vacuum may be provided by forming said substantially convex-shaped top, pressure vessel and removable sides as a sealed unit. Additional provisions to evacuate air may be provided via an air evacuation valve and vacuum pumping system.

Preferably, in use, said heat transfer medium is injected under pressure into said pressure vessel by means of a solar powered pump and a plurality of fine spray nozzles that are mounted at the inlet of said pressure vessel. The heat transfer medium is preferably pre-heated using solar energy directed onto a pre-heater tank which is located underneath and in direct contact with said reflector portion.

In order to optimise that overall efficiency of the heat transfer process, a plurality of attemperators are strategically positioned within said pressure vessel. The plurality of attemperators serve to prevent the heat transfer medium becoming too dry, as this would then cause a loss of pressure energy (kinetic energy). In use, said plurality of attemperators are provided by a plurality of spray nozzles that automatically spray a fine mist of cooler heat transfer medium into said pressure vessel. Said cooler heat transfer medium may be supplied from either a bypass chamber located in the unit or said pre-heater tank.

Once the treated heat transfer medium exits the pressure vessel at said outlet, it is put to work. In use, said treated heat transfer medium can be used to drive a turbine to generate electricity. Furthermore, the treated heat transfer medium can be put to further work, such as, for example, air conditioning, pasteurisation or desalination. The heat transfer medium eventually returns to an integral condenser unit situated above a main reservoir to start the cycle again.

Preferably, in use, the unit requires no external power other than light and solar energy. The solar powered pump can be provided with an auxiliary battery, if required for low-light conditions. The solar furnace also comprises an instrument panel which can record and display various measurements including temperature and pressure readings for data gathering and/or maintenance purposes.

Further preferably, the solar furnace comprises a fibre optic array positioned around the periphery of the lens array that collects thermal and solar energy and directs such onto the top surface of the pre-heater tank and/or the pressure vessel and/or the reflector portion.

Further according to the present invention there is provided a solar furnace for raising the temperature of a heat transfer medium, comprising; a lens array for admitting incident thermal and solar energy onto a reflector portion and a pressure vessel, said reflector portion being generally shaped so as to concentrate said solar energy onto said pressure vessel, said pressure vessel having an inlet through which said heat transfer medium is injected and a series of inner chambers having pressure sensitive one-way valves that allow said heat transfer medium to gather temperature and pressure energy and exit said pressure vessel at an outlet.

Also according to the present invention there is provided a method of utilising incident solar energy to raise the temperature of a heat transfer medium, comprising;

admitting and concentrating said incident solar energy onto the surface of a pressure vessel; and injecting pre-heated heat transfer medium into said pressure vessel, said pressure vessel comprising a central core which defines a continuous heat transfer path for said heat transfer medium to contact the surface of said pressure vessel, said continuous heat transfer path enabling the heat transfer medium to obtain optimum temperature and pressure energy over the full length of said pressure vessel.

It is believed that a solar furnace in accordance with the present invention at least addresses the problems outlined above. In particular, the advantages of the present invention are that in use the heat transfer medium at the outlet of the solar furnace can be used to generate electricity or be put to other work, such as, for example, air conditioning, pasteurisation or desalination. The heat transfer medium is then advantageously returned through a condenser to start the cycle again. The present invention is provided as a sealed unit which requires little or no maintenance and requires no external power other than solar energy. The present invention can be used in isolation, or a number of such units can be coupled together to provide an environmentally-friendly, tangible energy source or as a mobile unit to be used to supply emergency electrical power at humanitarian sites or situations. Once positioned and commissioned, the present invention will remain as a static power source throughout its operational life. The solar furnace described herein is totally self-contained, requiring no additional power and can be used at the most remote locations requiring very little maintenance.

It will be obvious to those skilled in the art that variations of the present invention are possible and it is intended that the present invention may be used other than as specifically described herein.

A specific non-limiting embodiment of the invention will be described by way of example and with reference to the accompanying drawings in which:

FIG. 7 illustrates a section of the side elevation of this lower profile embodiment of the present invention which further includes a tilting and slewing mechanism for tracking the sun in the sky;

Figure 1:
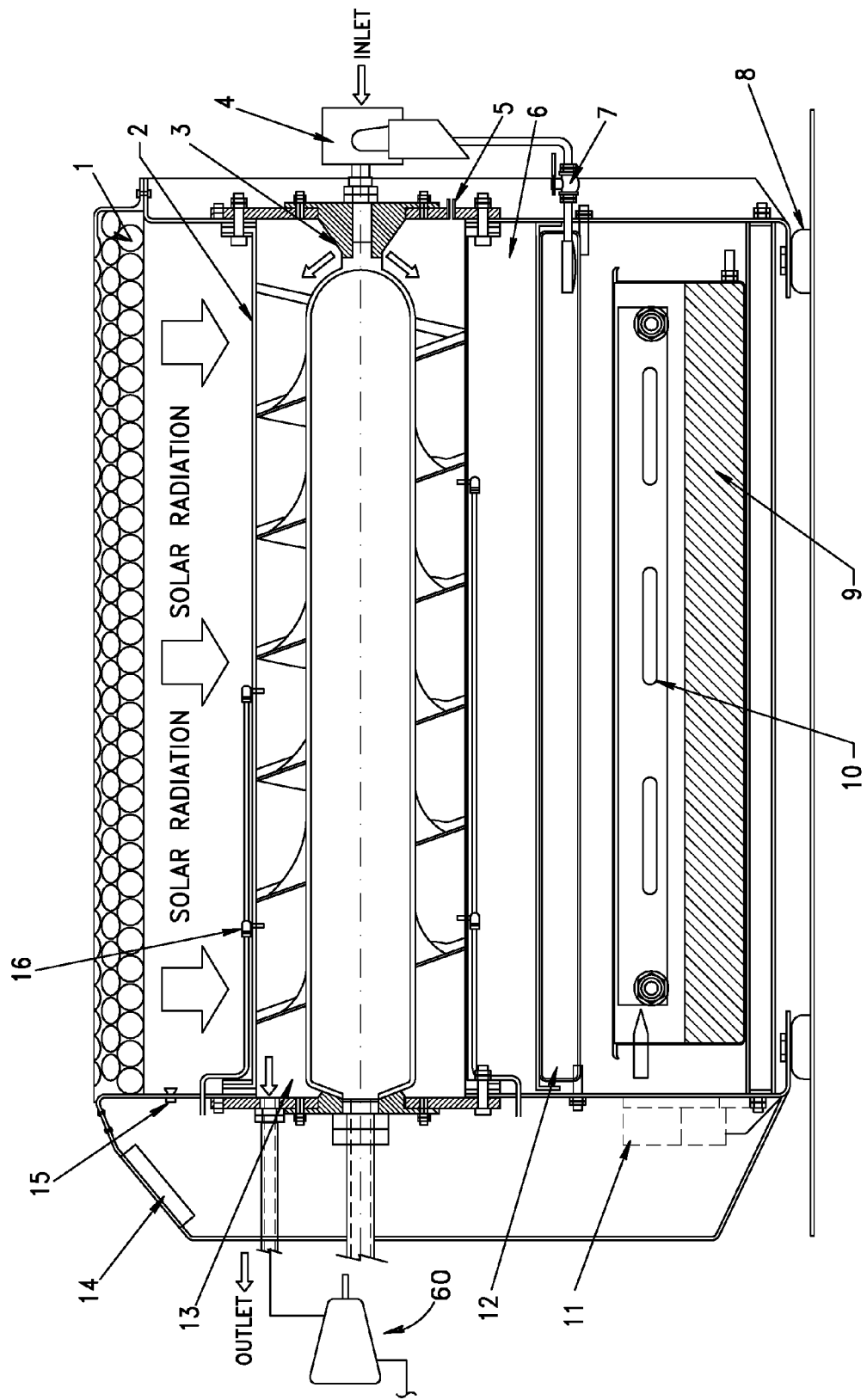
FIG. 1 illustrates a section of the side elevation of the present invention.
Figure 2:
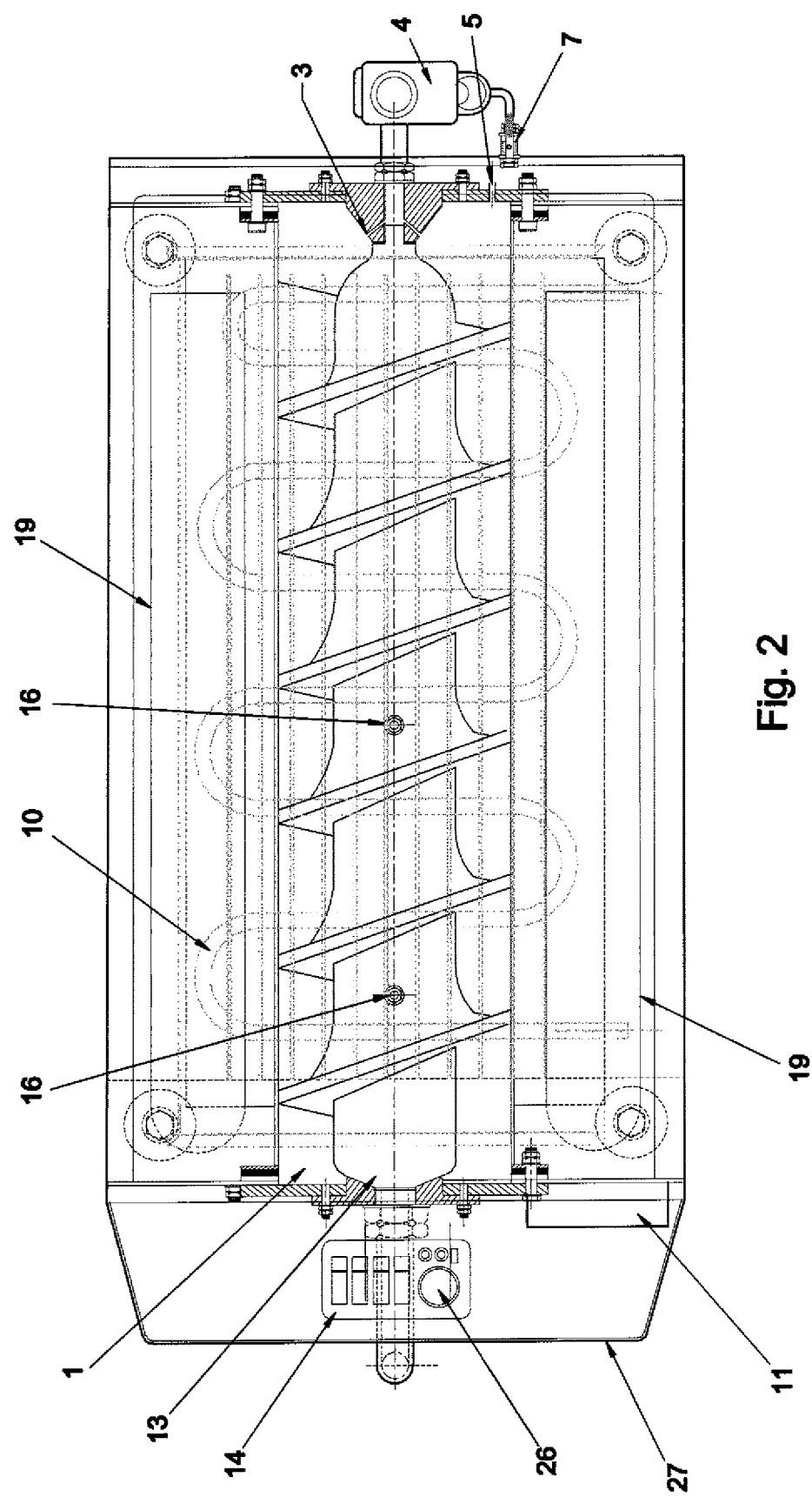
FIG. 2 is a plan view of the present invention.

FIG. 8 shows how the present invention can be implemented by using two scaled-up solar furnaces individually or in series housed in an standard 40' (12.192 m) container, and FIG. 9 shows a different embodiment of the present invention in which the pressure vessel is defined as a series of expansion chambers with one-way pressure release valves to allow a continuous pathway for the heat transfer medium.

Referring now to the drawings, the implementation of the present invention is shown in FIGS. 1 to 4. In use, the solar furnace according to the present invention is provided as a sealed unit comprising a main frame which is constructed of galvanised mild steel, with aluminium bulkheads and removable ABS or tubular sides 27, which can be secured using side panel fasteners 23. The unit is supported on shock mounts 8, which are situated at each corner of the main frame, and leveled before use.

The bulkhead at each end of the main frame supports a pressure vessel 2 through which a heat transfer medium is injected by means of solar powered pump 4. The pressure vessel 2 is fabricated of copper, although other materials having suitable thermal and mechanical properties could be utilised. In use, distilled water is used as the heat transfer medium, although further additives may be included to enhance heat transfer and prevent corrosion.

The internal structure of the pressure vessel 2 comprises a central core 13 having a substantially helical cross-section which defines a continuous heat transfer path for the heat transfer medium to contact the internal surface of the pressure vessel 2. In use, the surface of the pressure vessel 2 is extremely hot due to its constant bombardment with solar energy. The continuous heat transfer path enables the heat transfer medium to obtain optimum temperature and pressure energy (kinetic energy) over the full length of the pressure vessel 2.

Situated around the pressure vessel 2 is a reflector portion 24 that serves to direct incident solar energy onto the pressure vessel 2. The reflector portion 24 ensures that pressure vessel 2 is bombarded with greatly enhanced solar energy and light, and is substantially parabolic-shaped so as to direct as much of the incident solar energy onto the surface of the pressure vessel 2. Situated on top of the main frame is a convex top 1 which incorporates a series of light filters to stop light of unwanted frequency being admitted, and a lens array to enhance the wanted light values and solar energy. This gives a purer and more productive light that passes through the lens array being amplified many times before it bombards the pressure vessel 2. Those whose path has been so designed to bypass the pressure vessel 2 fall on the surface of the pre-heater tank 12. This surface has the ability to reflect back onto the pressure vessel 2 a percentage of the energy yet absorb the required quantity of heat and solar thermal energy to increase the heat transfer medium within the slab tank 12 to reach and maintain the required temperature. The convex top 1 also acts as a protective cover that automatically closes down in low-light conditions or during hours of darkness, thus protecting the unit from adverse weather.

Furthermore, in order to increase the overall efficiency of the heat transfer process, the area around the pressure vessel 2 (denoted as numeral 6 in FIG. 1) is evacuated. In use, this vacuum could be provided by forming the convex top 1, pressure vessel 2 and side plates 27 as a substantially sealed unit, with additional provisions to evacuate air, if required, via air evacuation valve 15 and a vacuum pumping system (not shown).

Each side 27 of the unit, which is insulated, contains a reserve slab tank (if required) than can maintain the heat transfer medium at an even temperature throughout the hours of darkness. The main reservoir/condenser box 9, which is again insulated, is housed within the base of the main frame.

Figure 3:
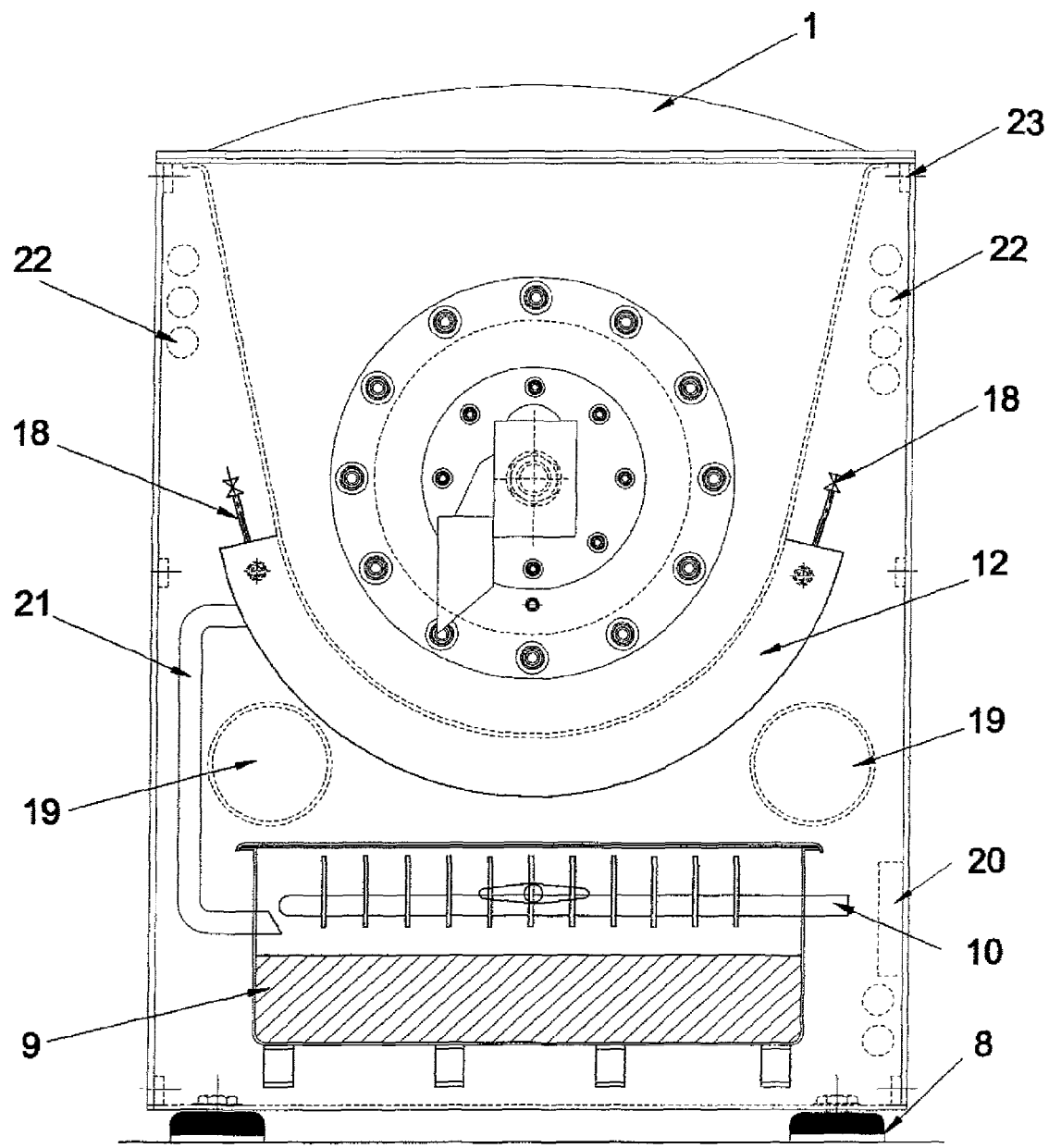
FIG. 3 shows further detail of the end elevation of the present invention from viewpoint A in FIG. 1.

The operation of the unit is described as follows. Pre-heated heat transfer medium is injected under pressure into the pressure vessel 2 by means of solar powered pump 4 and a plurality of fine spray nozzles 3 that are mounted on the inlet flange. The pre-heated heat transfer medium is delivered to these nozzles 3 by the pump 4 at around 2-3 bar and at just below boiling point. The heat transfer medium is pre-heated using solar energy directed onto the pre-heater tank 12 which is located underneath and in direct contact with the reflector portion 24, as shown in FIG. 3. In order to prevent potentially dangerous pressures occurring in the pre-heater tank 12, at least one automatic air bleed valve 18 is included to allow the pre-heater tank 12 to vent. In use, the supply of heat transfer medium can be controlled using ball valve 7 and the temperature and pressure of the heat transfer medium at the inlet of the pressure vessel 2 can be continuously monitored using probe 5.

Upon injection into the pressure vessel 2, the heat transfer medium hits the sides of the pressure vessel 2 and instantly atomises. This contact causes the heat transfer medium to flash and gain kinetic energy and move forward at greater speed. This process continues along the length of the continuous heat transfer path defined by the central core 13 having a substantially helical cross-section and the inside surface of the pressure vessel 2. In use, the temperature and pressure of the heat transfer medium at the outlet point 17 of the pressure vessel 2 is around 130° C. and 12 bar.

To maintain the highest quality of heat transfer medium, a number of attemperators 16 are strategically positioned within the pressure vessel 2. The attemperators 16 serve to prevent the heat transfer medium becoming too dry, as this would then cause a loss of pressure energy (kinetic energy). The attemperators 16 are small spray nozzles that automatically spray a fine mist of cooler heat transfer medium, which is supplied directly from either a bypass chamber 19 located in the unit or the pre-heater tank 12, into the pressure vessel 2. In use, a pre-heater balance pipe 21 is also included in the heat transfer medium circuit between the pre-heater tank 12 and main reservoir 9, as shown in FIG. 3.

Once the treated heat transfer medium exits the pressure vessel 2 at the outlet 17, it is put to work. Such can be used to drive a turbine (not shown) to generate electricity before the heat transfer medium continues to do further work, such as, for example, air conditioning, pasteurisation or desalination. It is envisaged that the turbine 60 is produced as a two wheel steam turbine that has a single balanced shaft which has an electrical generator built around the output end. This gives the maximum power output with the use of frictionless bearings and specially wound armatures. The heat transfer medium eventually returns to condenser plates 10 situated above the main reservoir 9 to start the cycle again. If desired, the main reservoir 9 is maintained at an optimum level using the condenser feed 25.

The unit requires no external power other than light and solar energy. The small injector 3 and pump 4 are solar powered with an auxiliary battery 11, if ever required. The unit also comprises an instrument panel 14 which can record and display various measurements including temperature and pressure readings 26 for data gathering and/or maintenance purposes. Electrical cables being passed internally along cable trays 20 and conduits 22

As the unit is non-directional, once positioned and commissioned it can remain as a static power source throughout its operational life. Maintenance is minimal other than cleaning the lens surface on the convex top 1 and visual checks to ensure there are no leaks.

Figure 4:
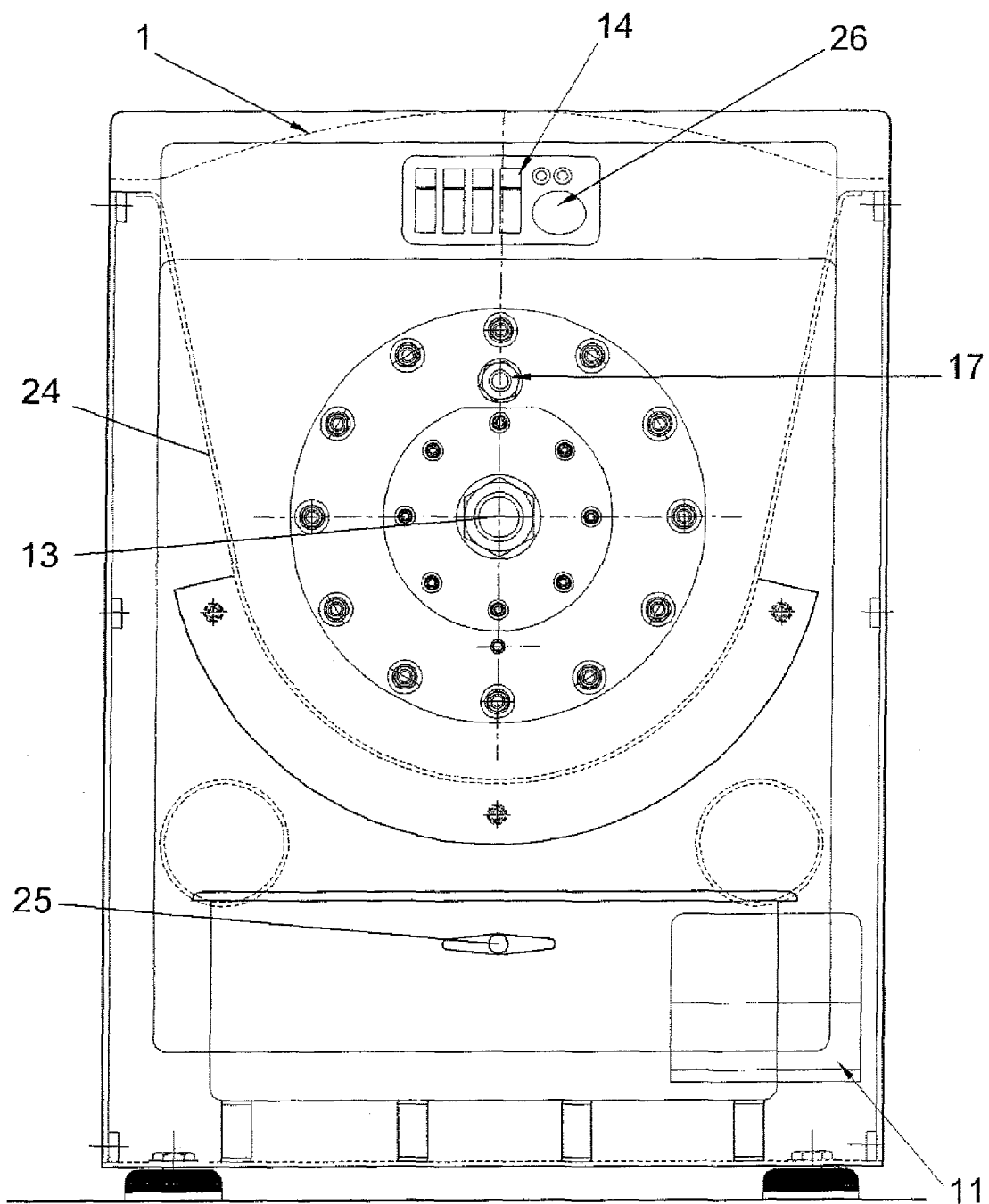
FIG. 4 illustrates further detail of the end elevation of the present invention from viewpoint B in FIG. 1.
Figure 5:
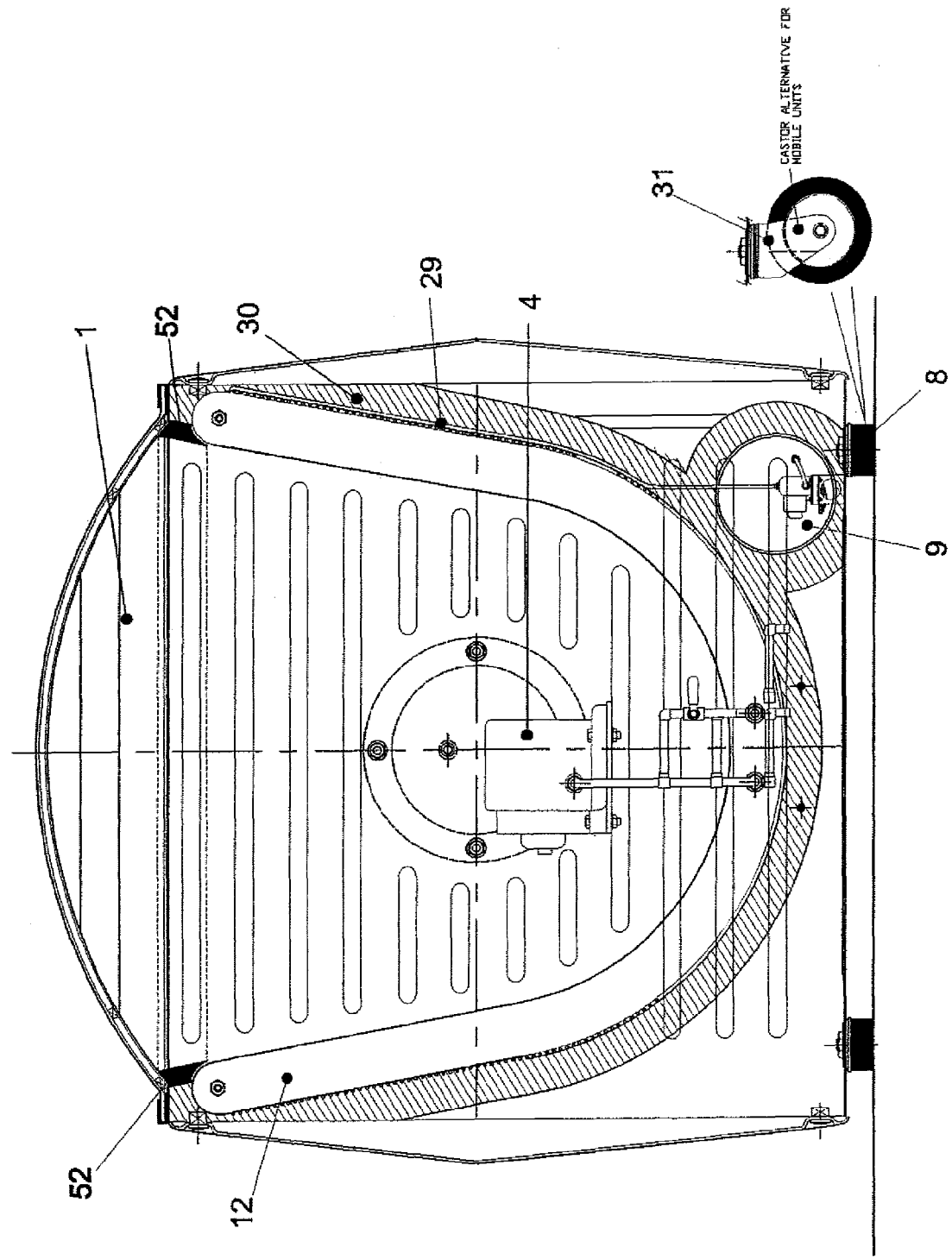
FIG. 5 illustrates a section of the side elevation of a different embodiment of the present invention which also includes a pre-heater feed coil which is used to raise the temperature of the heat transfer medium prior to being injected into the pressure vessel.

FIG. 5 shows a further embodiment of the present invention in which the pre-heater tank 12 is extended along the entire length of, or is integral with, the reflector portion 24 to maximise the incident solar radiation. Also, in this embodiment, towards the rear of the pre-heater tank 12, a continuous pre-heater feed coil 29 is positioned which is used to raise the temperature of the heat transfer medium prior to being injected into the pressure vessel 2. The design of the solar furnace of FIG. 5 also includes a slightly different condensation reservoir 9 which has a circular cross-section positioned at one side of the shaped reflector portion 24. This allows for a larger reflector portion 24 than is depicted in FIGS. 1 and 4. FIG. 5 also shows that the condensation reservoir 9, pre-heater tank 12 and pre-heater feed coil 29 are backed with a thermal insulation layer 30 to retain as much of the incident solar heat as possible. FIG. 5 also shows that the shock mounts 8 can be replaced with braked castors 31 to assist in making the unit more mobile.

FIG. 5 also shows how the solar furnace can include a fibre optic skirt or array 52 positioned around the periphery of the convex top 1 in order to take advantage of incident solar radiation that would otherwise not be put to useful work. In particular, the fibre optic skirt or array 52 comprises of a plurality of optical fibres that are grouped or bundled together into a broad strip that collects selected enhanced light energy and directs such onto the top surface of the pre-heater tank 12 and/or the pressure vessel 2 and/or the reflector portion 24. The array 52 maximises the light energy that would otherwise simply fall around the edge of the solar furnace. The skilled person will appreciate that such an embodiment could be incorporated in any of the solar furnaces described herein forming part of the present invention.

The skilled person will appreciate that that the exhausted steam medium is after exiting the steam turbine (not shown) directed either to do further work or return to the condenser box 9 to cool then start again on its circuit through the pre-heater coils 29 that are wrapped around the outside of the slab tank 12, where they collect latent heat trapped between the slab tank 12 and the insulation jacket 30 before entering the slab tank 12 to be further heated to reach the operational temperature required.

The operation of the unit is described as follows. The solar powered pump 4 extracts medium at a given temperature, this is governed by a thermocouple (not shown) that opens and closes the gate valve at specified temperatures, and injects the medium into the pressure vessel at 2 or 3 bar via a cluster of atomisers 3. The medium then instantly changes to a steam medium and starts its journey through the pressure vessel 2 gathering pressure energy and temperature. The integrity of the steam medium is controlled by a number of strategically positioned attemperators 16 that stop the steam medium from losing energy through becoming too dry. Once the treated heat transfer medium exits the pressure vessel 2 at the outlet 17, it is put to work.

Figure 6:
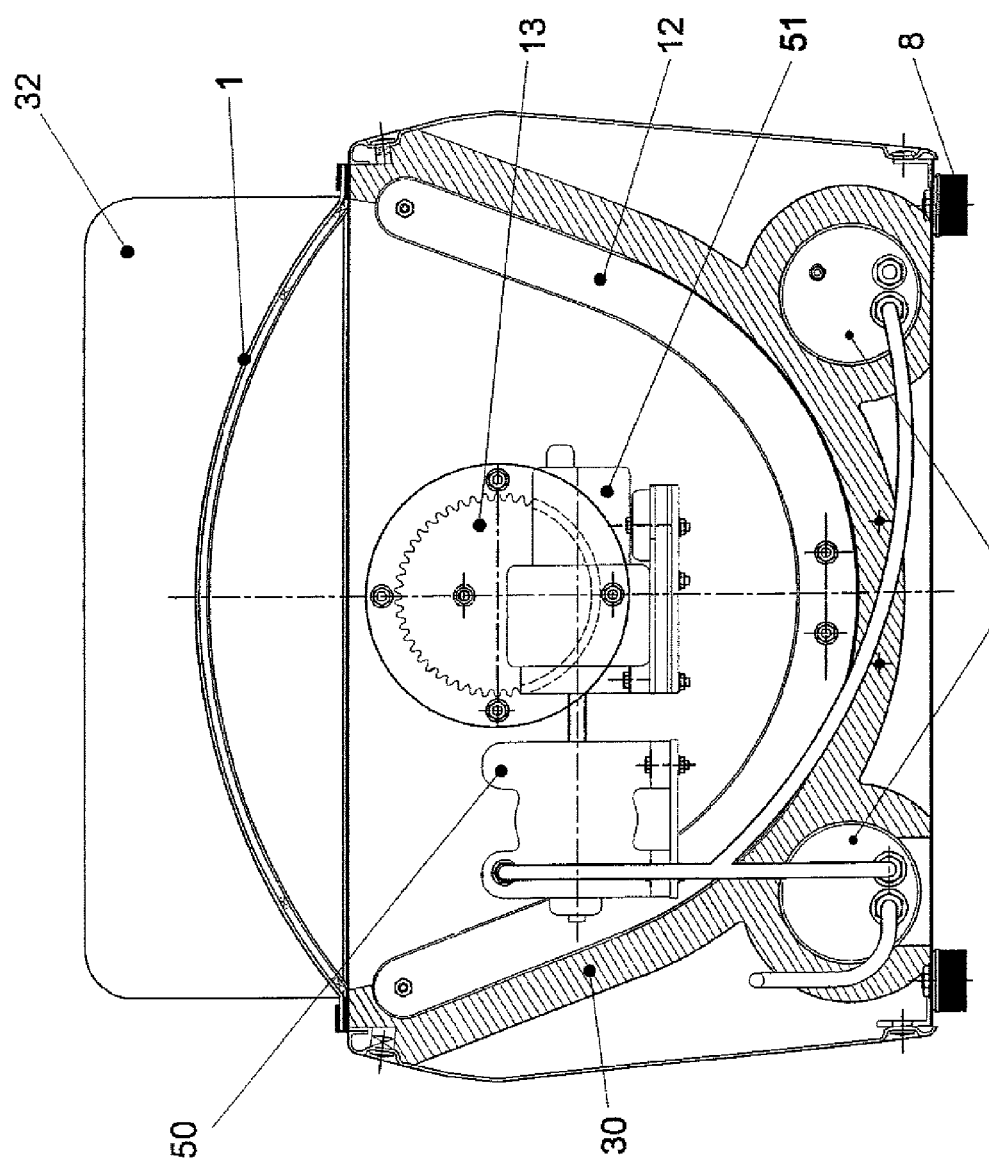
FIG. 6 illustrates a section of the side elevation of a lower profile embodiment of the present invention which can be used in geographical areas where the sun does not climb too high in the sky in the winter months.

FIGS. 6 and 7 shows further embodiments of the present invention. In particular, the solar furnace of the present invention can be implemented in lower profile design. The design of which is particularly useful in geographical areas where the sun does not climb too high in the sky in the winter months. In this way, the output from the sun can be maximised. FIG. 6 shows a fixed lower profile design very similar to that disclosed in FIG. 5. FIG. 6 shows how the present invention can be implemented using a windshield 32 integral to, or part of, the convex top 1. The transparent windshield 32 serves to reduce any thermal losses that can occur from the wind blowing across the top of the solar furnace.

FIG. 6 shows in further detail how the heated transfer medium can be used to generate electricity. In particular, the output of the pressure vessel 2 is fed to a steam turbine 50 that drives an electrical generator 51. After performing work, the heat transfer medium is returned the condenser box 9 to cool before starting the cycle again.

FIG. 7 takes the design of FIG. 6 even further, and shows that the lower profile solar furnace of the present invention can be secured on a pair of pillars 33 which are mounted on a mounting plate 34. The device also includes a solar powered motor and gearbox assembly 35 which can be used to tilt the solar furnace via gear mechanism 36. The invention also includes a slewing ring 37 through which the whole device can rotate. In this way, the solar furnace is able to track, as far as possible, the progress of the sun through the sky to maximise and capture as much of the incident solar radiation as possible.

FIG. 8 shows how two scaled-up solar furnaces, either working individually or in series, can be housed in a standard 40' (12.192 m) container 38. In this way, it is envisaged that an output of at least 250 kVA could be generated. The real advantage of this approach is that the container could be quickly brought to any location where electrical energy is required, particularly in emergency and humanitarian situations. The unit shown in FIG. 8 includes a separate control room 39. Again, the unit requires no external power other than light, and additional start-up electrical energy from photovoltaic cells or panels 40 located on the roof of the container 38 could also be used. Access to the container 38 being provided through access door 41.

FIG. 9 shows further detail of the internal design of an alternative approach for the pressure vessel 2. In this embodiment, as shown in FIG. 9, the pressure vessel 2 is formed having an annular cross-section which includes a central portion 42. Radiating outwards from the central portion 42 are a plurality of sections or vanes 43 which define a series of inner chambers 44 connected by pressure sensitive one-way valves 45 that allow the heat transfer medium to gather pressure energy on its path through the pressure vessel 2 before being exited to enter the turbine (not shown) at the outlet. This causes the steam medium on its pathway through to increase its temperature and pressure at each allowed chamber 44 to expand prior to entering a new chamber 44. The pressure vessel 2 using a system of expansion chambers 44 with one-way pressure release valves 45 allows a continuous pathway for the heat transfer medium.

To prevent the heat transfer medium becoming too dry, the pressure vessel 2 of FIG. 9 also includes a plurality of attemperators 16 strategically positioned around the pressure vessel 2. The attemperators 16 automatically spray a fine mist of cooler heat transfer medium, which is supplied directly from either a bypass chamber 19 located in the unit, or the pre-heater tank 12, into the pressure vessel 2.

Various alterations and modifications may be made to the present invention without departing from the scope of the invention.

The invention claimed is:

1. A solar furnace for raising the temperature of a heat transfer medium, comprising:
 a reflector portion;
 a pressure vessel including:
  an inlet through which said heat transfer medium is injected;
  an outlet;
  a central core having a helical cross-section which defines a continuous heat transfer path for said heat transfer medium to contact the surface of said pressure vessel and exit said pressure vessel at the outlet; and
  a plurality of attemperators positioned within said pressure vessel; and
 a lens array for admitting incident thermal and solar energy onto the reflector portion and the pressure vessel, said reflector portion being generally shaped so as to concentrate said solar energy onto said pressure vessel.

2. The solar furnace as claimed in claim 1, further comprising:
 a substantially convex-shaped top that incorporates a series of light filters, the lens array formed as part of the substantially convex-shaped top.

3. The solar furnace as claimed in claim 1, wherein said heat transfer medium is distilled water.

4. The solar furnace as claimed in claim 3, wherein said distilled water includes additives to enhance heat transfer and prevent corrosion.

5. The solar furnace as claimed in claim 1, wherein said reflector portion ensures that pressure vessel is bombarded with greatly enhanced solar energy and light, and is shaped so as to direct the incident solar energy onto the surface of said pressure vessel.

6. The solar furnace as claimed in claim 1, wherein said reflector portion is formed from a reflective material having a substantially parabolic cross-section.

7. A solar furnace as claimed in claim 1, further comprising:
 a main frame, the pressure vessel being mounted to the main frame;
 bulkheads secured to the main frame; and
 removable sides, which can be removably secured to the main frame with fasteners.

8. The solar furnace as claimed in claim 7, wherein the area around the pressure vessel is evacuated.

9. The solar furnace as claimed in claim 8, wherein said vacuum is provided by forming a substantially convex-shaped top, pressure vessel and removable sides as a sealed unit.

10. The solar furnace as claimed in claim 8, further comprising an air evacuation valve and vacuum pumping system configured to evacuate the solar furnace.

11. The solar furnace as claimed in claim 1, further comprising a plurality of fine spray nozzles that are mounted at the inlet of said pressure vessel and configured to inject the heat transfer medium, under pressure, into the pressure vessel.

12. The solar furnace as claimed in claim 1, further comprising: a pre-heater tank and a pre-heater coil arrangement located underneath and in direct contact with said reflector portion, the solar energy being directed onto the pre-heater tank and the pre-heater coil arrangements to pre-heat the heat transfer medium.

13. The solar furnace as claimed in claim 1, wherein said plurality of attemperators are provided by a plurality of spray nozzles that spray a fine mist of cooler heat transfer medium onto said pressure vessel.

14. The solar furnace as claimed in claim 13, further comprising a bypass chamber, said cooler heat transfer medium is supplied from either the bypass changer located in the furnace or said pre-heater tank.

15. The solar furnace as claimed in claim 1, wherein the pressure vessel is fluidically coupled to a turbine, the heat transfer medium exiting the pressure vessel is used to drive the turbine to generate electricity.

16. The solar furnace as claimed in claim 1, further comprising an integral condenser unit situated above a main reservoir, the heat transfer medium exiting the pressure vessel returns to the an integral condenser unit to start the cycle again.

17. The solar furnace as claimed in claim 1, further comprising a solar powered pump, wherein said heat transfer medium is injected into the pressure vessel by the solar powered pump.

18. The solar furnace as claimed in claim 1, further comprising a fibre optic array positioned around the periphery of the lens array that collects thermal and solar energy and directs such onto the top surface of the pre-heater tank and/or pressure vessel and/or the reflector portion.

19. A method of utilizing incident solar energy to raise the temperature of a heat transfer medium, comprising:
  admitting and concentrating said incident solar energy onto the surface of a pressure vessel;
  injecting pre-heated heat transfer medium into said pressure vessel, said pressure vessel comprising a central core which defines a continuous heat transfer path for said heat transfer medium to contact the surface of said pressure vessel, said continuous heat transfer path enabling the heat transfer medium to obtain optimum temperature and pressure energy over the full length of said pressure vessel; and
  introducing cooler heat transfer medium with attemperators positioned within the pressure vessel to prevent the heat transfer medium within the pressure vessel becoming too dry.

* * * * *